May 15, 1934. P. F. MURRAY 1,958,797
BACON RIND REMOVING MACHINE
Filed Nov. 2, 1932
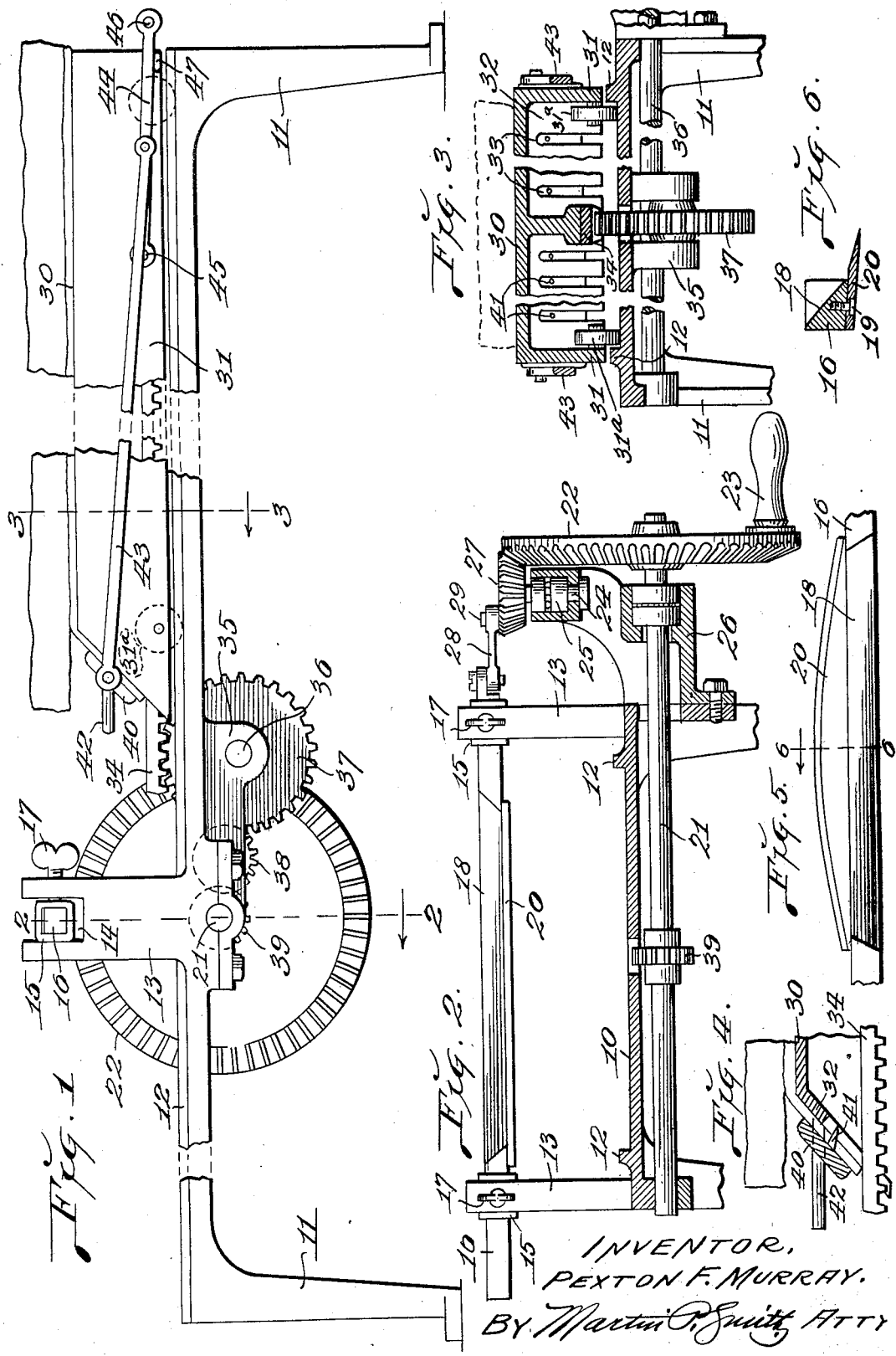
INVENTOR,
PEXTON F. MURRAY.
BY Martin P. Smith, ATTY Patented May 15, 1934

1,958,797

UNITED STATES PATENT OFFICE 1,958,797

BACON RIND REMOVING MACHINE

Pexton F. Murray, Montebello, Calif.

Application November 2, 1932, Serial No. 640,773

5 Claims. (Cl. 146—130)

My invention relates to a machine for removing the rind from bacon and the principal object of my invention is, to provide a relatively simple, practical and inexpensive machine which may be conveniently and economically employed for rapidly performing the work incident to the removing of rind from bacon and which machine is especially designed for use in establishments where large pieces or "sides" of bacon are cut into smaller pieces or slices and sold in retail trade.

Further objects of my invention are, to provide a bacon rind removing machine having a bacon carrier that is arranged to move toward and beneath a reciprocating blade which cuts the rind from the body of bacon; further, to provide simple and efficient means for clamping one end of the rind to the carrier so as to effectively hold the piece of bacon in firm position while being engaged by the knife or blade; further, to provide simple and efficient means which may be operated by hand or motor for simultaneously reciprocating the knife or blade so as to thereby more effectively perform the rind cutting operation and to simultaneously move the bacon carrier toward and beneath the reciprocating blade and further, to provide simple and efficient means for adjusting the knife or blade vertically so as to regulate the horizontal plane of cut of the knife and consequently enabling the same to be employed with equal advantage upon sides of bacon having rinds of different thicknesses.

With the foregoing and other objects in view, my invention consists in certain novel features of construction and arrangements of parts that will be hereinafter more fully described and claimed and illustrated in the accompanying drawing in which:

Fig. 1 is a side elevational view of a bacon rind removing machine constructed in accordance with my invention.

Fig. 2 is a vertical cross section taken on the line 2—2 of Fig. 1.

Fig. 3 is a vertical cross section taken on the line 3—3 of Fig. 1 with parts broken away.

Fig. 4 is a vertical section taken through the forward portion of the traveling carrier and showing the means utilized for clamping the end of the rind to said carrier.

Fig. 5 is a plan view of the reciprocating knife.

Fig. 6 is an enlarged cross section taken on the line 6—6 of Fig. 5.

Referring by numerals to the accompanying drawing which illustrates a preferred embodiment of my invention, 10 designates a plate preferably formed of metal and which forms the table of the machine and said table being supported by suitably located legs 11.

Formed on top of the table 10 adjacent to and parallel with its side edges, are longitudinally disposed upwardly projecting ribs 12 that form guides for the wheels of the traveling table.

Formed integral with or fixed to the sides of the table are transversely aligned standards 13, the upper ends of which are provided with vertically disposed slots or notches 14 for the accommodation of short tubular bearings 15, which are square or non-circular in cross section and which bearings receive the end portions of a reciprocating blade carrying bar 16.

The bearings 15 are arranged to be adjusted vertically within the slots or notches 14 and after such adjustment such bearings are clamped in their adjusted positions by set screws 17.

The intermediate portion of the bar 16 is cut away to form an inclined or beveled face 18 that extends from the front lower edge of the bar upwardly and rearwardly to the upper rear edge, and detachably secured to the underside of the intermediate portion of said bar 16, preferably by means of screws 19, is a plate 20 of relatively hard metal having its front edge sharpened to form a cutting edge.

This plate is applied to the underside of the bar 16 so that it occupies a slightly inclined position relative to a horizontal plane with its sharpened edge projecting downwardly as illustrated in Fig. 6.

The width of this blade 20 is greatest at its center and the sharpened front edge of said blade curves gradually rearward as it approaches the ends of said blade. As a result of this construction, the sharp edge of the blade imparts a shear cut to the bacon as said blade is reciprocated.

Journaled in suitable bearings on the under side of table 10, preferably at a point directly beneath the standards 13, is a transversely disposed shaft 21 and detachably secured to one end of said shaft is a beveled gear wheel 22. A handle 23 projects outwardly from the outer face of this gear wheel adjacent to its edge.

A short vertically disposed shaft 24 is journaled in an anti-friction bearing 25 that is arranged in the upper portion of a bracket 26 that is secured to the side of table 10 and the upper end of said shaft 24 carries a beveled pinion 27 that engages the teeth of the beveled gear wheel 22.

One end of a short link or pitman 28 is connected to a wrist pin 29 that projects upwardly from pinion 27 and the opposite end of this link or pitman is pivotally connected to the adjacent end of the knife carrying bar 16.

The construction just described provides simple and efficient means for developing rotary motion and converting the same into reciprocatory motion and imparting the latter to the knife carrying bar 16.

The bacon carrier that is mounted for longitudinal travel upon the table comprises a flat plate or table 30 of metal having depending flanges 31 at its sides and a depending inclined flange 32 at its forward end, said last mentioned flange occupying a plane of approximately 45° relative to the vertical and horizontal. This flange is provided with a series of spaced parallel slots 33 that extend from the lower edge of said flange upwardly toward its upper end.

Suitably secured to the underside of table 30 is a centrally arranged longitudinally extending bar 34 provided in its underface with rack teeth.

Journaled in suitable bearings 35 on the underside of table 10, is a short shaft 36 carrying gear wheel 37, the teeth of which engage the teeth of rack bar 34 and meshing with the teeth of said gear wheel, is a suitably journaled pinion 38. The teeth of this pinion 38 engage the teeth of a pinion 39 that is secured upon the central portion of shaft 21.

Journaled on the inner lower portions of the depending flanges 31, adjacent to the ends of the bacon carrier, are small wheels 31ª, which occupy positions just inside the flanges 12 and these wheels provide a rolling support for the carrier.

The means utilized for clamping the forward end of the bacon rind to the forward inclined end 32 of the traveling carrier, comprises a transversely disposed clamping plate or bar 40 that lies across the inclined face of plate 32 and projecting from the inner face of this bar is a series of prongs 41 that are adapted to pass through the end of the bacon rind and into the slots 33.

Bar 40 is mounted for sliding movement toward and away from inclined plate 32 by means of short pins or rods 42 that project forwardly from said plate 32.

Pivotally connected to the ends of clamping bar 40, are the forward ends of arms 43 that lie alongside the traveling carrier 30 and the rear ends of these arms are pivotally connected to the intermediate portions of levers 44 and the forward ends of the latter being fulcrumed at 45 to the sides of the traveling carrier.

The outer ends of the levers 40 are connected by a transverse rod 46 that functions as a handle to raise and lower the levers and under normal conditions or when the bar 40 is in clamping engagement with the end of the bacon rind, the levers 44 rest on stops 47 that project from the sides of the traveling carrier at the rear end thereof.

When levers 44 normally rest on the stops 47, they are slightly inclined relative to a horizontal plane as illustrated in Fig. 1, and thus the pivot points between the rear ends of arms 43 and levers 44 are slightly "below center", thereby holding the bar 40 in clamping engagement with the end of the bacon rind.

In the operation of my improved bacon rind removing machine, a side of bacon is laid with the rind surface downward on the top of the traveling carrier and a short portion of the rind at the forward end of said bacon is cut away from the meat and extended downwardly over the inclined plate 32, beneath clamping bar 40 and which latter has been moved forward as a result of raising the handle 46 that connects the outer ends of levers 44.

The handle 46 and levers are now swung downward and through arms 43 the clamping bar 40 is brought to bear upon the downwardly turned end of the rind to clamp the same against plate 30 and the prongs 41 pass through the rind to thereby firmly secure and hold same during the rind removing operation.

The operator now engages handle 23 and rotates beveled gear wheel 22 and shaft 21 and as the shaft is thus rotated, the rotary motion thereof will be transmitted by pinion 39 to pinion 38 and thence to gear wheel 37, the teeth of which engage the teeth of rack bar 34.

As a result of this engagement, the bacon carrier is moved toward the knife and which latter reciprocates lengthwise as a result of the engagement of the teeth or gear wheel 22 with pinion 27 and the pitman connection between said pinion and the end of the knife carrying bar 16.

Thus the traveling carrier is moved beneath the reciprocating knife and the latter cuts the meat from the rind and the meat passes upwardly over the sharp edge of the knife and thence upwardly over the inclined face 18 of bar 16 until the rind is entirely cut from the body of bacon.

Among the particularly desirable features of my improved bacon rind removing machine, are the means for firmly clamping one end of the rind to the traveling carrier, the blade reciprocating means, the vertical adjustment of the bar that carries the knife or blade in order to effectively cut rind of different thicknesses from the bacon and the means for simultaneously reciprocating the blade or knife and moving the bacon carrier toward and beneath the knife to effect the rind removing operation.

Thus it will be seen that I have provided a bacon rind removing machine that is relatively simple in construction, inexpensive of manufacture and very effective in performing the functions for which it is intended.

It will be understood that minor changes in the size, form, and construction of the various parts of my improved bacon rind removing machine may be made and substituted for those herein shown and described without departing from the spirit of the invention, the scope of which is set forth in the appended claims.

I claim as my invention:

1. In a bacon rind removing machine, a table, a bacon carrier mounted for longitudinal movement upon said table, the forward end of said carrier being inclined, a transversely disposed clamping bar arranged on the inclined forward end of said carrier, horizontally disposed pins projecting forwardly from the end portions of the inclined forward end of said carrier, which pins pass through the ends of said clamping bar for supporting the same and means for drawing said bar into clamping engagement with bacon rind lying on the inclined forward end of said carrier.

2. In a bacon rind removing machine, a table, a bacon carrier mounted for longitudinal movement upon said table, the forward end of said carrier being inclined, a transversely disposed clamping bar arranged on the inclined forward end of said carrier, horizontally disposed pins projecting forwardly from the end portions of the inclined forward end of said carrier, which pins pass through the ends of said clamping bar for supporting the same, means for drawing said bar into clamping engagement with bacon rind lying on the inclined forward end of said carrier and bacon rind engaging prongs projecting from the inner face of said clamping bar.

3. In a bacon rind removing machine, a table, a bacon carrier mounted for longitudinal movement upon said table, the forward end of which carrier is inclined, pins seated in the inclined forward end of said carrier and projecting forwardly therefrom, a bacon rind clamping bar mounted for sliding movement on said pins, arms pivotally connected to the ends of said clamping bar and extending alongside the bacon carrier, crank arms mounted on the rear portions of the sides of said bacon carrier and the rear ends of said arms being pivotally connected to said crank arms intermediate their ends.

4. In a bacon rind removing machine, a table, a bacon carrier mounted for longitudinal movement upon said table, the forward end of which carrier is inclined, pins projecting forwardly from the end portions of said inclined forward end, a bacon rind clamping bar mounted for sliding movement upon said pins and means arranged on the sides of the carrier and connected to the ends of said bar for drawing the same toward the inclined end of the carrier to clamp the end portion of a bacon rind between the inclined forward end of the carrier and said bar.

5. In a bacon rind removing machine, a table, a bacon carrier mounted for longitudinal movement upon said table, the forward end of which carrier is inclined and said inclined forward end being slotted, pins projecting forwardly from the end portions of said inclined forward end, a bacon rind clamping bar mounted for sliding movement upon said pins, prongs projecting from said clamping bar through the slots in the inclined forward portion of said carrier and means arranged on the sides of the carrier and connected to the ends of said bar for drawing the same toward the inclined end of the carrier to clamp the end portion of a bacon rind between the inclined forward end of the carrier and said bar.

PEXTON F. MURRAY.